US012678751B2

(12) United States Patent
Darrington

(10) Patent No.: US 12,678,751 B2
(45) Date of Patent: Jul. 14, 2026

(54) STATIC MIXER RESISTANT TO HEAT, CORROSION AND DISSOLUTION

(71) Applicant: AFFIVAL, Solesmes (FR)

(72) Inventor: Matthias Darrington, Vienne (FR)

(73) Assignee: AFFIVAL SAS, Solesmes (FR)

( * ) Notice: Subject to any disclaimer, the term of this patent is extended or adjusted under 35 U.S.C. 154(b) by 416 days.

(21) Appl. No.: 18/546,612

(22) PCT Filed: Feb. 23, 2022

(86) PCT No.: PCT/EP2022/054543

§ 371 (c)(1),
(2) Date: Aug. 16, 2023

(87) PCT Pub. No.: WO2022/180106

PCT Pub. Date: Sep. 1, 2022

(65) Prior Publication Data

US 2024/0131481 A1 Apr. 25, 2024
US 2024/0226824 A9 Jul. 11, 2024

(30) Foreign Application Priority Data

Feb. 24, 2021 (FR) ........................................ 2101787

(51) Int. Cl.
*B01F 25/00* (2022.01)
*B01F 25/421* (2022.01)
(Continued)

(52) U.S. Cl.
CPC ........ *B01F 25/422* (2022.01); *B01F 25/4233* (2022.01); *B01F 25/43197* (2022.01);
(Continued)

(58) Field of Classification Search
CPC ................ B01F 25/4233; B01F 25/432; B01F 25/43197; B01F 35/561
See application file for complete search history.

(56) References Cited

U.S. PATENT DOCUMENTS 3,526,391 A 9/1970 Church, Jr.
3,682,446 A 8/1972 Eron
(Continued)

FOREIGN PATENT DOCUMENTS

CN 102 182 492 9/2011
DE 19743957 7/1999
(Continued)

OTHER PUBLICATIONS

International Search Report for PCT/EP2022/054543 dated Jun. 3, 2022.
Preliminary Search Report for FR 2101787 dated Oct. 26, 2021.

*Primary Examiner* — Anshu Bhatia
(74) *Attorney, Agent, or Firm* — B. Aaron Schulman, Esq.; Stites & Harbison, PLLC

(57) ABSTRACT

The present disclosure relates to a mixer device having a housing including at least first and second adjacent mixing cells (2, 3), each cell (2, 3) including a fluid inlet opening (21, 31) and a fluid outlet opening (22, 32), the inlet opening being offset from the outlet opening so that the axis of the inlet opening is parallel to the axis of the outlet opening, the outlet opening of the first cell being connected to the inlet opening of the second cell via a connecting channel.

12 Claims, 6 Drawing Sheets

(51) Int. Cl.

| | |
|---|---|
| ***B01F 25/422*** | (2022.01) |
| ***B01F 25/431*** | (2022.01) |
| ***B01F 25/432*** | (2022.01) |
| ***B01F 25/452*** | (2022.01) |
| ***B01F 35/00*** | (2022.01) |

(52) U.S. Cl.

CPC ...... *B01F 25/432* (2022.01); *B01F 25/45241* (2022.01); *B01F 35/561* (2022.01)

(56) References Cited

U.S. PATENT DOCUMENTS

| | | | | |
|---|---|---|---|---|
| 3,941,355 | A * | 3/1976 | Simpson | B01F 25/434 261/DIG. 26 |
| 6,447,158 | B1 | 9/2002 | Farkas | |
| 7,316,503 | B2 | 1/2008 | Mathys et al. | |
| 8,740,450 | B2 | 6/2014 | Mogami et al. | |
| 9,757,683 | B1 * | 9/2017 | Pease | B01F 25/422 |
| 2004/0223408 | A1 | 11/2004 | Mathys et al. | |
| 2008/0224066 | A1 | 9/2008 | Nolen et al. | |
| 2010/0276820 | A1 | 11/2010 | Mogami et al. | |
| 2013/0175306 | A1 | 7/2013 | Frailey | |
| 2013/0242692 | A1 | 9/2013 | Soukup | |
| 2024/0131481 | A1 | 4/2024 | Darrington | |
| 2024/0226824 | A9 | 7/2024 | Darrington | |

FOREIGN PATENT DOCUMENTS

| | | | | |
|---|---|---|---|---|
| GB | 1 188 516 | | 4/1970 | |
| GB | 1188516 | A * | 4/1970 | B01F 5/0608 |
| JP | A-2003010866 | | 1/2003 | |
| JP | A-2004113968 | | 4/2004 | |
| JP | 2006-514852 | | 5/2006 | |
| JP | A-2013208579 | | 10/2013 | |
| JP | 2015-83282 | | 4/2015 | |
| KR | 10-1101957 | | 1/2012 | |
| KR | 10-2019-0056603 | | 5/2019 | |
| KR | 20190056603 | | 5/2019 | |

* cited by examiner

STATIC MIXER RESISTANT TO HEAT, CORROSION AND DISSOLUTION

BACKGROUND OF THE INVENTION

Field of the Invention

The present invention relates to the general technical field of static mixers or dispersers intended for mixing fluid products.

Within the framework of the present invention, "fluid product" refers to a powder, liquid or viscous product, likely, if appropriate, to contain solid elements in pieces.

Such a mixer can be used in many applications requiring the mixing of at least two products, in particular in the fields of the food industry, metallurgy, the pharmaceutical industry, the petrochemical industry, water treatment, cooling, nuclear, etc.

Description of Related Art

Different devices are known for mixing two (or more than two) constituents together to form a mixture.

Such devices are based on the disturbing effects of the presence of an obstacle on the passage of the constituents to be mixed. Such effects could be:

- either successive fractionations of the stream into separate stream lets,
- or a deviation of the stream lets in a non-axial direction,
- or in the introduction of a rotation of the fluids,
- or in the creation of turbulence by wake effect or by a difference of velocity between inter-related stream lets.

Figure 1:
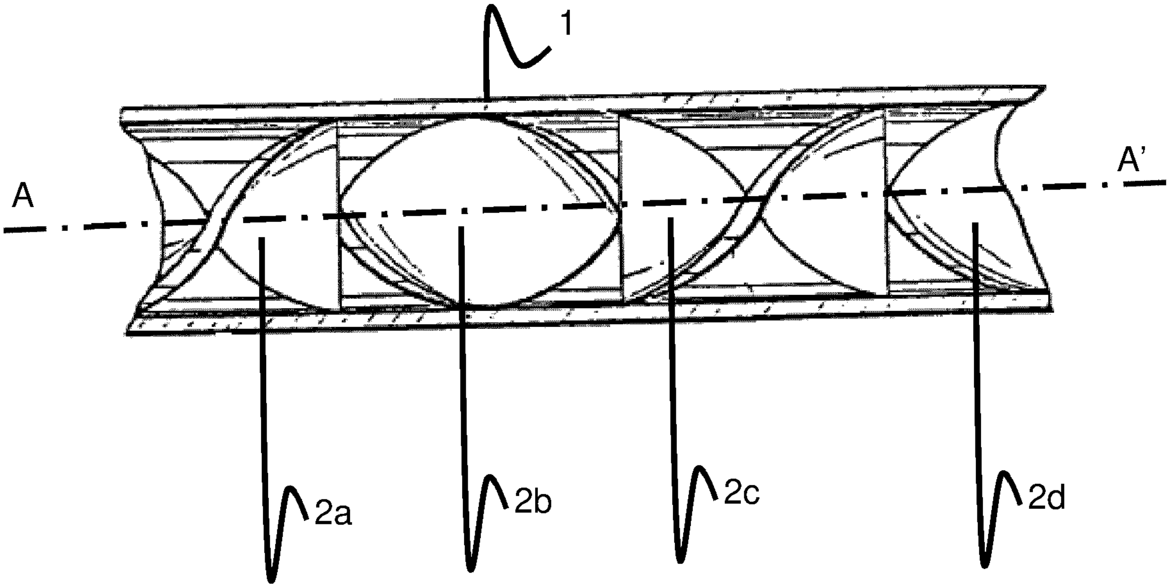

FIG. 1 shows an example of a mixer used for transforming heterogeneous fluid flows into a homogeneous fluid flow. Such mixer comprises a tube 1 wherein the fluids to be mixed circulate. A succession of helical blades 2*a*, 2*b*, 2*c*, 2*d* extends inside the tube 1, each helical blade 2*b*, 2*d* being angularly offset from the adjacent helical blades 2*a*, 2*b* along the axis A-A' of the tube 2 so as to divide the fluid flows into separate stream lets in order to facilitate the mixing thereof.

However, such a mixer has drawbacks:

- the succession of helical blades 2*a*-2*d* has a complex shape expensive to make, and the insertion of which into the tube 1 is difficult,
- such complex shape often requires the use of plastic or metallic materials which can react with the constituents of the flows to be mixed,
- the bulk thereof is considerable, in particular longitudinally,
- the inlet ports for the fluids to be mixed and the outlet port for the mixed fluid are located at the opposite ends of the tube 1, which, in addition to the problems of bulk, could raise problems of homogeneity and leaks, in particular when such a mixer is used directly on a bath,
- same is not very resistant to extreme temperatures, in particular hot temperatures, which tend to melt the succession of helical blades.

A goal of the present invention is to propose a mixer device for remedying at least one of the aforementioned drawbacks.

BRIEF SUMMARY OF THE INVENTION

To this end, the invention proposes a mixer device comprising a tubular housing, the housing including at least:

- at least one inlet port for feeding in constituents to be mixed, and
- at least one outlet port for the recovery of a mixed product composed of said constituents, remarkable in that the housing further comprises at least first and second adjacent mixing cells, the second cell extending over the first cell, each of the first and second cells including a fluid inlet opening and a fluid outlet opening provided on opposite walls, the inlet opening being offset from the outlet opening such that the axis of the inlet opening is parallel to the axis of the outlet opening, the outlet opening of the first cell being connected to the inlet opening of the second cell via a connecting channel.

The fact that the inlet and outlet openings of each cell are offset maximizes the flow path of constituents within each cell. Moreover, the fact that the cells are successively connected to each other maximizes the circulation path through the entire housing.

As a result of the circulation through the various cells of the housing, the first and second components fed into the housing, mix to form a mixed product. The latter is extracted from the mixer device via the outlet port. The reader should understand that the number of cells contained in the housing, and/or the dimensions thereof and/or the material forming each cell depends on the intended application, the desired homogeneity of the mixed product, and the characteristics (solubility, viscosity, etc.) of the components to be mixed.

Hereinafter, it will be understood that when a mixing cell is mentioned as being "over" another mixing cell, the cell can be:

- directly over the other cell, or be
- above the other cell and separated from said other cell by one (or a plurality of) element(s), such as a layer of insulating material (thermally and/or electrically and/or chemically) or an intermediate mixing cell.

It will also be understood that when a cell is mentioned as being "over" another cell, the cell can cover the entire surface of the other cell or a portion of the other cell.

Certain preferred aspects, but not limited to, of the mixer device according to the invention are the following:

- the housing can be cylindrical and have coaxial tubular inner and outer walls defining a space for receiving the mixing cells;

It is thereby possible to define a central channel for the passage of related technical elements possibly needed according to the intended application (electric cable, heating resistance, cooling fluid, discharge of the mixed fluid, installation of a rotating element (e.g. including at least one blade), etc.), or yet for facilitating the discharge of any gases generated during the mixing of the first and second constituents,

- each mixing cell can have a cylindrical shape and extend between the inner and outer walls of the housing;

It is thereby possible to enhance the convective movements of the fluid in each cell so as to homogenize the mixture of the first and second constituents,

- at least one of the mixing cells can have diametrically opposed fluid inlet and outlet openings;

The length of the flow path in the mixing cell is thereby maximized,

- the mixer device can comprise a plurality of superimposed mixing cells, the superimposed cells being arranged so that the outlet of each upper cell extends in front of the inlet of the lower cell on which same is placed;

It is thereby possible to limit the bulk of the mixer device while maximizing the length of the path of circulation of the fluids through the entire housing, the plurality of mixing cells can comprise:

an initial cell into wherein the components to be mixed are fed, and a final cell through which the mixed product is discharged, the outer wall of the housing comprising a bottom for the recovery of the mixed product being discharged from the final cell;

The mixed product can thereby be stored prior to the extraction thereof from the mixer device, the inner wall of the housing defines a discharge channel for the mixed product, the mixer device comprising a suction nozzle intended for being arranged in the discharge channel for the extraction of the mixed product;

The inlet and outlet ports can thereby be arranged at the same end of the mixer device without increasing the overall bulk of the mixer device, the housing can extend longitudinally, the inlet and outlet ports extending at the same end of the housing;

at least one of the cells can comprise an element forming an obstacle, such as a ball in the flow path of the first and second components;

A better homogenization of the first and second constituents can thereby be achieved, the mixer device can comprise:

a first tubular casing including a bottom, a second tubular case having an outside diameter smaller than the inside diameter of the first casing, the second casing including circular rings on the outer face thereof each having at least one through aperture, said rings extending radially and protruding towards the outside of the second casing, the diameter of the rings being substantially equal to the inner diameter of the first casing, the second casing being intended to be inserted into the first casing so that the first and second casings extend coaxially, the rings defining with the inner face of the first casing, the mixing cells of the mixer device.

It is thereby possible to simplify the manufacture of the mixer device since the first and second casings form simple machining parts which can be made of brittle and not very flexible materials, resistant to corrosion and high temperatures.

BRIEF DESCRIPTION OF THE SEVERAL VIEWS OF THE DRAWING(S)

Figure 2:
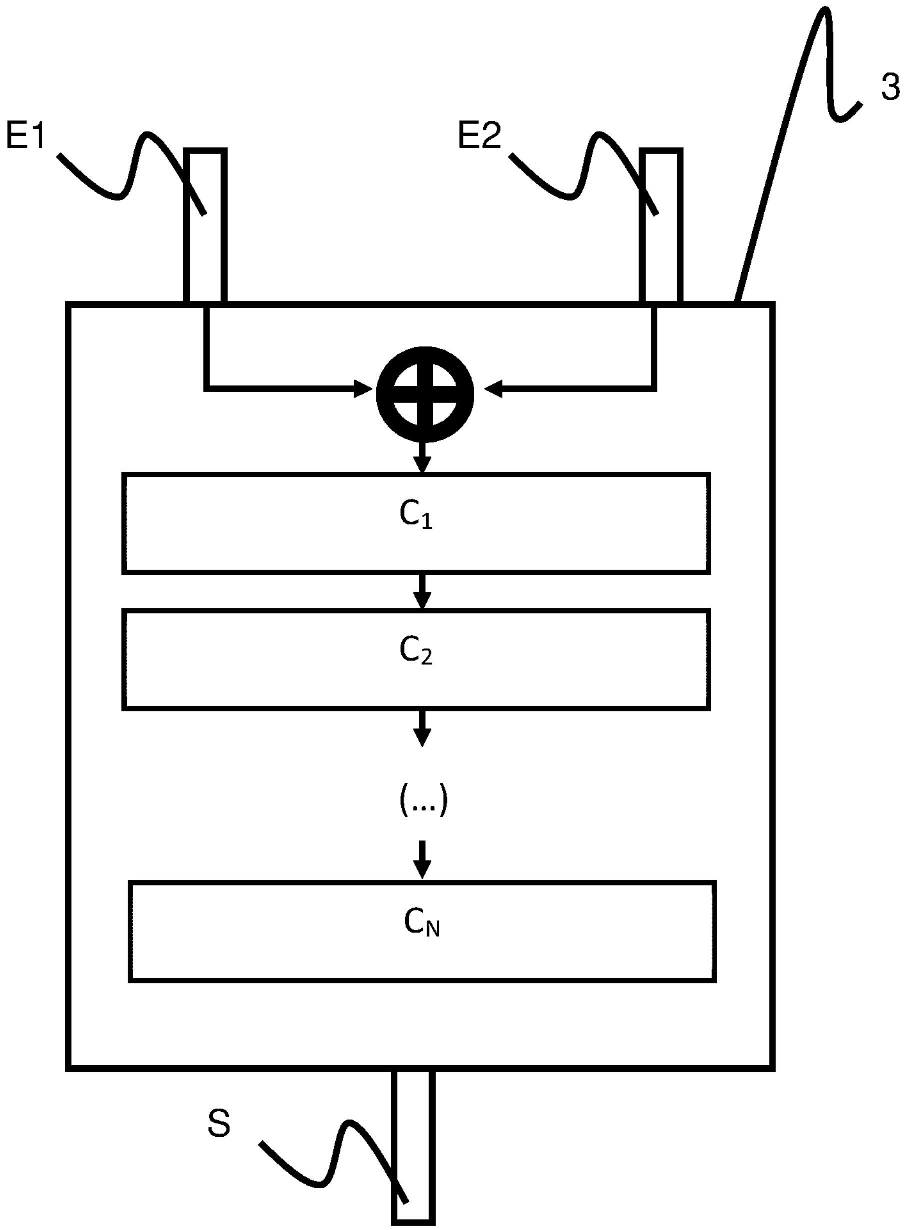
Figure 3:
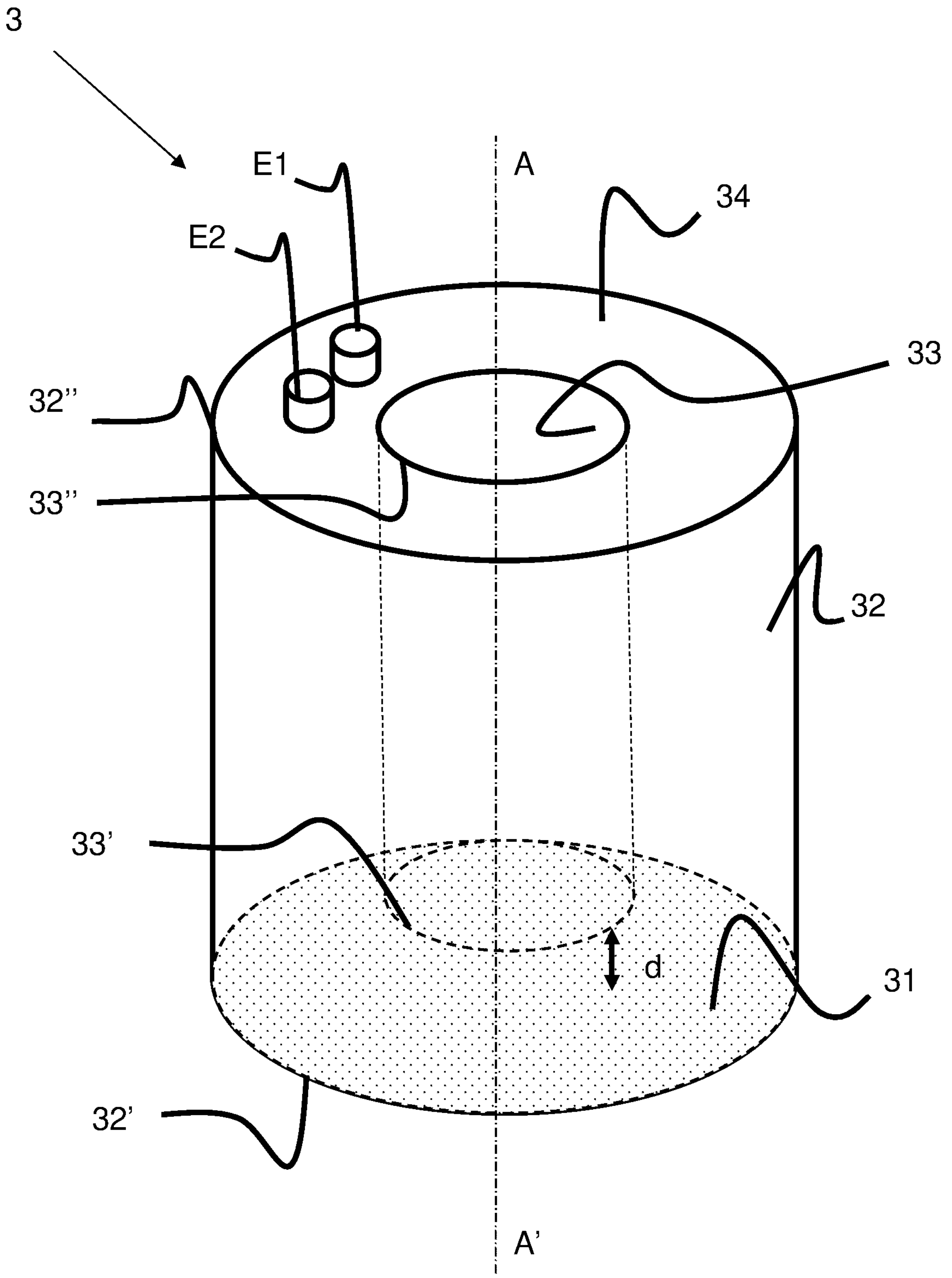
Figure 4:
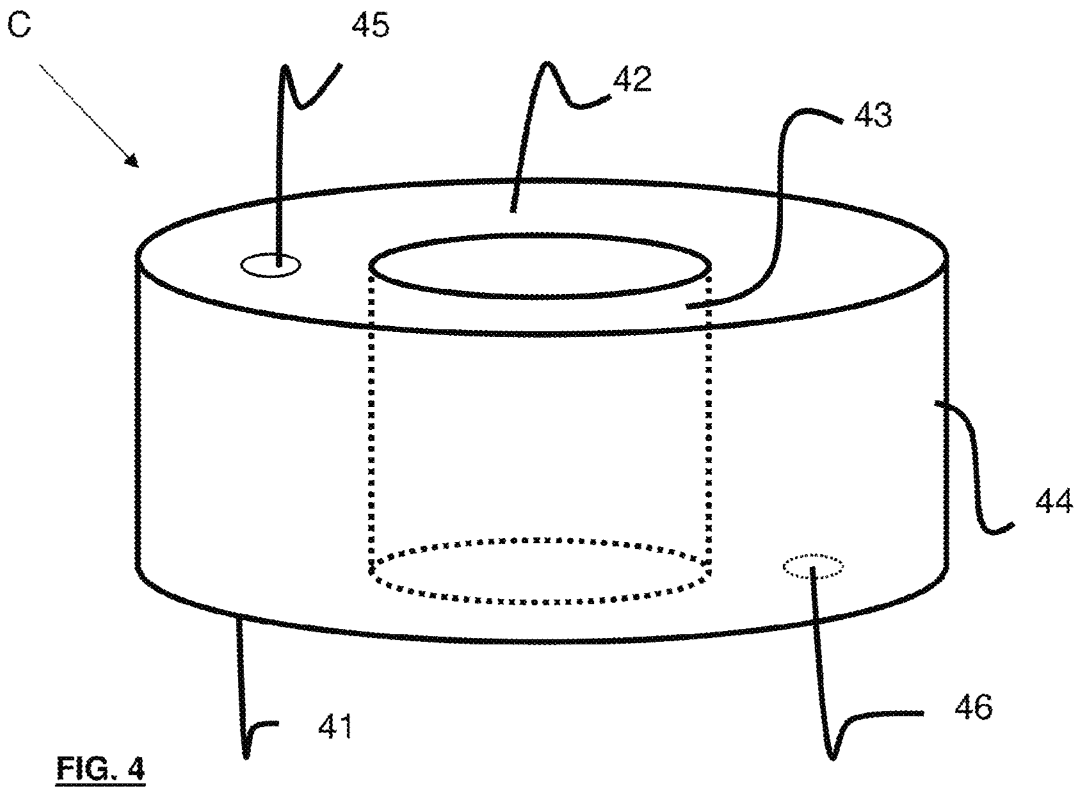
Figure 5:
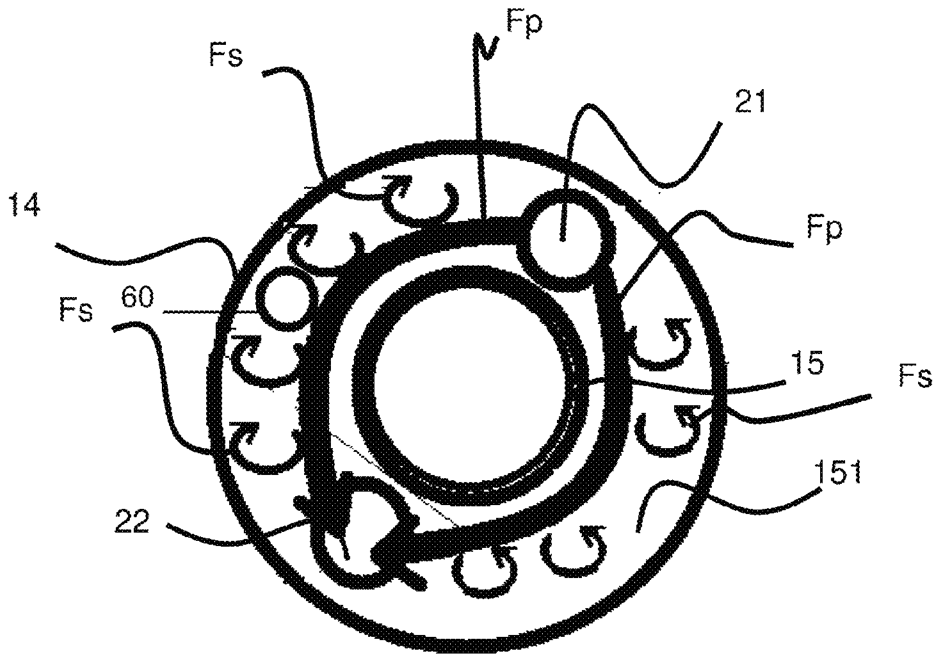
Figure 6:
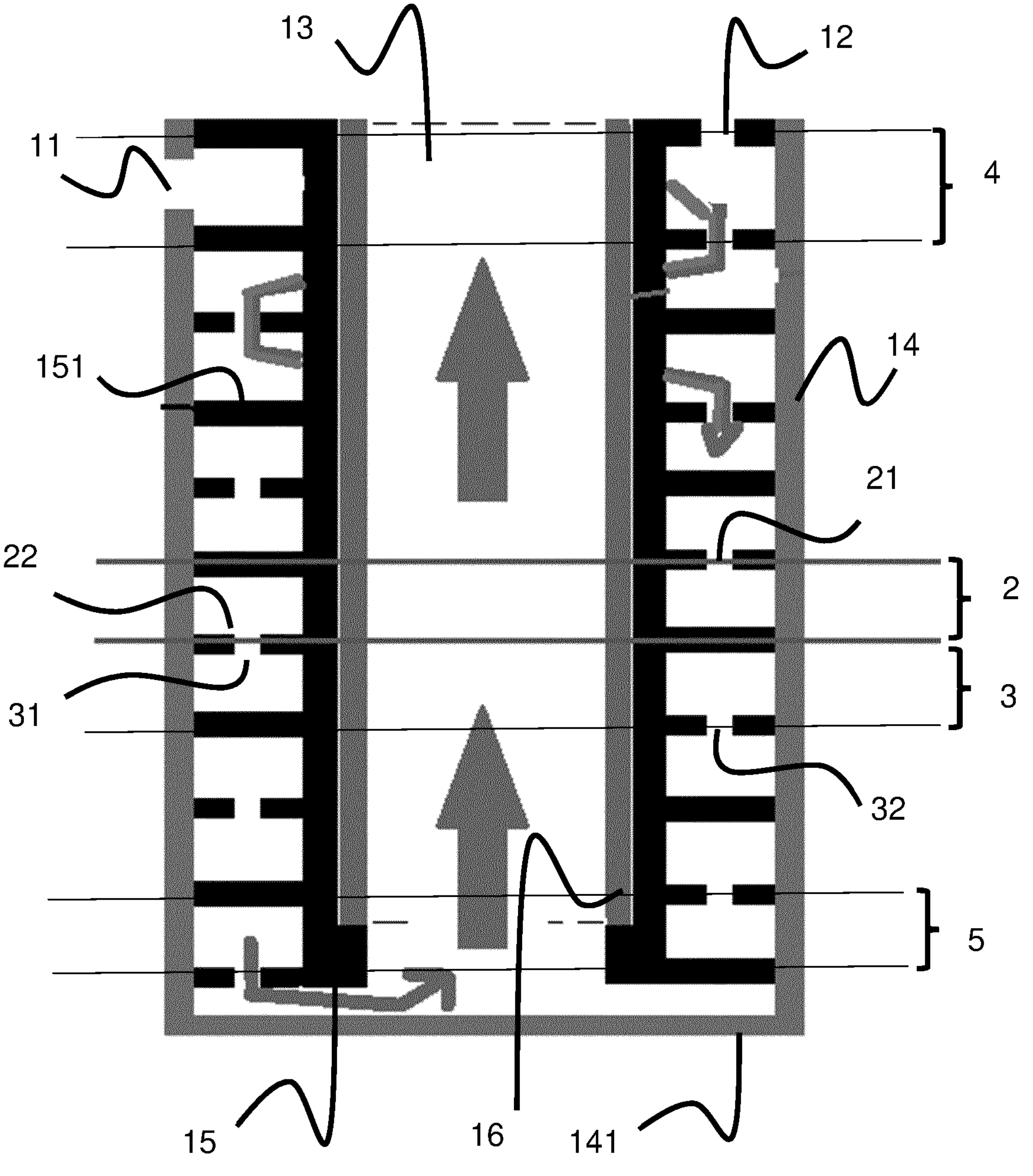
Figure 7:
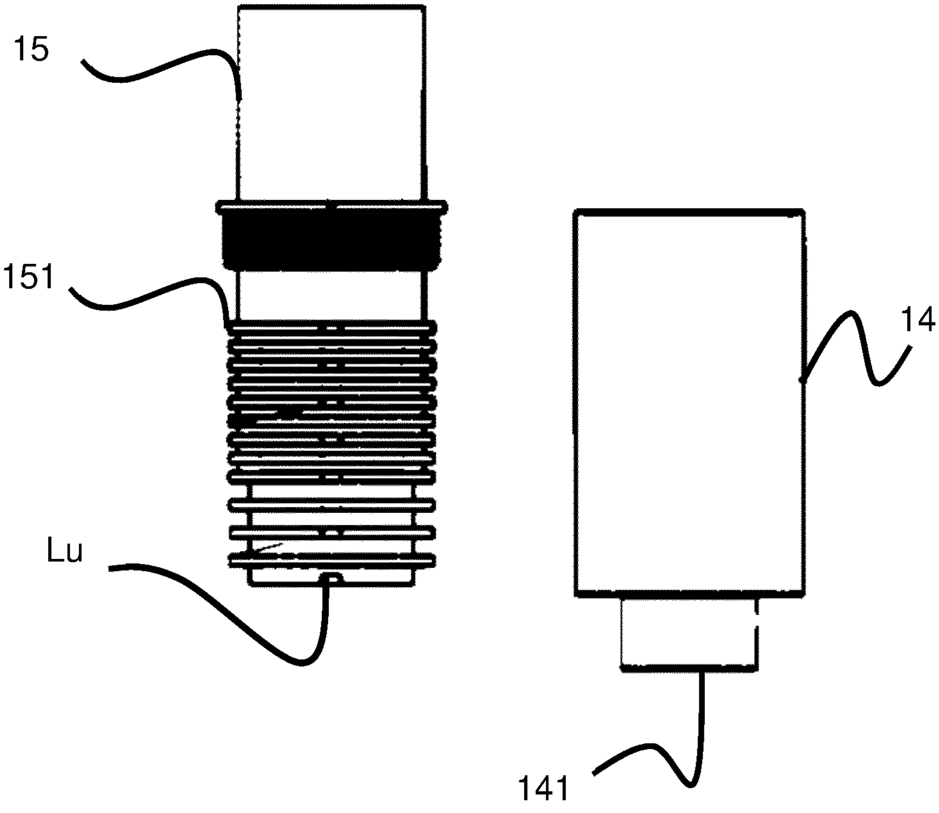

Other advantages and features of the mixer device according to the invention will become more apparent from the following description of a plurality of variants of embodiment, given as examples, but not limited to, from the attached drawings wherein:

FIG. 1 is a representation of a mixer device of the prior art,

FIG. 2 is a schematic operational representation of the mixer device according to the invention, FIG. 3 is a perspective view of a variant of embodiment of a housing of the mixer device according to the invention, FIG. 4 is a schematic perspective view of an example of a cell of the mixer device according to the invention, FIG. 5 is a transverse section schematic representation of the mixer device according to the invention, FIG. 6 is a longitudinal section schematic representation of the mixer device according to the invention, FIG. 7 is a longitudinal section schematic view of an example of embodiment of the mixer device.

DETAILED DESCRIPTION OF THE INVENTION

The mixer device according to the invention will now be described in greater detail with reference to the figures. In the different figures, the equivalent elements have the same numerical reference.

1. Mixer Device

1.1. General Information

With reference to FIG. 2, the mixer device comprises a housing 3 and a plurality of cells $C_1$-$C_N$ stacked in the housing. Such a mixer device—called a “static mixer”—is used for mixing two (or more than two) fluid constituents.

The housing comprises one or a plurality of inlet ports for the inlet of components to be mixed. For example, in some embodiments, the housing comprises a single inlet port for the inlet of a heterogeneous fluid composed of two (or more than two) components to be mixed (i.e., simultaneous inlet of a plurality of components to be mixed via a single inlet port).

In a variant and as illustrated in FIG. 2, the housing can comprise a first inlet port E1 for the admission of a first fluid constituent, and a second inlet port E2 for the admission of a second fluid constituent. Of course, the reader should understand that, depending on the intended application, the housing can comprise more than two inlet ports (including three, four, five, etc.) for the intake of more than two fluid components to be mixed.

The housing 3 further comprises one or a plurality of outlet ports S for discharging the mixed product obtained from the first and second fluid components.

The first and second fluid components can consist of different materials, or identical materials having different characteristics (concentration, viscosity, etc.).

Each cell $C_1$-$C_N$ defines a circulation chamber for the fluid constituents to be mixed with each other. As illustrated in FIG. 2, the cells $C_1$-$C_N$ communicate with each other so as to form a circulation path for the fluid constituents to be mixed.

1.2. Housing

A variant of embodiment of the housing 3 is illustrated in FIG. 3. In such variant embodiment, the housing 3 has an overall cylindrical shape with a longitudinal axis A-A'.

Of course, the housing 3 can have other shapes such as a parallelepipedal shape, an ovoid shape, etc.

With reference to FIG. 3, the housing 3 comprises:

a circular bottom 31, an outer side wall 32 having an edge 32' attached to the bottom 31, an inner side wall 33 (coaxial with the outer side wall 32), and an annular upper wall 34 extending between the edges 32'', 33'' of the inner and outer lateral walls 32, 33 opposite the bottom 31.

As described hereinabove, the housing 3 comprises first and second inlet ports E1, E2 for feeding in the fluid constituents to be mixed. The inlet ports E1, E2 can be positioned adjacent to each other and extend into the annular upper wall 34. In a variant, the inlet ports E1, E2 can be diametrically opposed and/or extend into the outer lateral wall 32.

The housing 3 further comprises an outlet for discharging the mixed product. In the embodiment illustrated in FIG. 3, the outlet port consists of a gap separating the bottom 31 and a free edge 33' of the inner lateral wall 33 (edge opposite the annular upper wall 34). More precisely, the free edge 33' of the internal lateral wall 33 is spaced a distance "d" from the bottom 31.

The housing is configured for receiving cells. More precisely, the walls of the housing define a space for receiving a plurality of stacked cells $C_1$-$C_N$.

Thereby, the shape of the housing determines the shape of the cells same contains. For example, if the housing has a shape with an oval cross section, then the cells also have a shape with an oval cross section.

Hereinafter, the cells will be described with reference to a cylindrical housing, while it is understood that the cells can have other shapes.

1.3. Cell 1.3.1. Intermediate Cells

With reference to FIG. 4, each cell comprises:

- a lower partition 41—in particular annular—including inner and outer peripheral edges,
- an upper partition 42—in particular annular—including inner and outer peripheral edges,
- an inner lateral partition 43 between the inner peripheral edges of the lower 41 and upper 42 partitions
- an external lateral partition 44 between the outer peripheral edges of the lower 41 and upper 42 partitions.

The partitions 41-44 of the cell C define a chamber for the circulation of the fluid constituents to be mixed. The inner lateral partition 43 of each cell C forms an obstacle which the fluid constituents have to bypass during the circulation thereof through the chamber of the cell C. The main flow Fp of the fluid constituents is subdivided, each subdivision forming a circular secondary flow Fs which recombines with the main flow Fp, then subdivides again and so on. The succession of subdivisions and recombinations of the secondary flows Fs with the main flow Fp enhances the mixing of the constituents to be mixed.

Each cell C further comprises:

- an inlet opening 45 for feeding in the first and second components to be mixed, and
- an outlet opening 46 for the discharge of the first and second constituents after the circulation thereof through the chamber delimited by the partitions 41-44 of the cell C.

Advantageously, the inlet opening 45 can be provided in the upper partition 42 and the outlet opening 46 can be provided in the lower partition 41. A circulation of the first and second constituents to be mixed by gravity is thereby possible.

The dimensions of the circulation chamber defined between the partitions of the cell are designed for enhancing the mixing of the constituents when same flow through the cell. In particular:

- the distance between the inner and outer side walls can be comprised between 1 millimeter and 10 centimeters, and
- the distance separating the upper and lower partitions can be comprised between 1 millimeter and 10 centimeters.

For example, in the case of an inlet flow-rate of the components to be mixed on the order of 3 $cm^3$/second:

- the distance separating the lateral partitions can be chosen to be between 2-3 millimeters and
- the distance separating the upper and lower partitions can be chosen to be equal to 1 millimeter.

Of course, the selection of the dimensions of the circulation chamber defined by each cell depends on the intended application, and in particular on the type of constituents to be mixed, the respective viscosities thereof, etc. In particular, the reader should understand that the dimensions of the circulation chamber defined by each cell can be greater than one centimeter (e.g. on the order of magnitude of one meter for an inlet flow rate on the order of one $dm^3$/sec, etc.).

In order to promote mixing of the first and second constituents, one (or a plurality of or each) cell(s) can comprise one (or a plurality of) element(s) forming an obstacle, such as a ball 60 positioned on the flow path of the first and second constituents. The element(s) forming obstacle(s) disturb the main flow so as to enhance the subdivision thereof into a plurality of secondary flows recombining with the main flow in order to induce a mixing of the constituents to be mixed.

The cells thereby described are intended for being stacked one on top of the other in the housing 3. The cells are arranged between:

- an initial cell connected to the first and second inlet ports E1, E2 of the housing,
- a final cell connected to the outlet port of the housing.

1.3.2. Initial and Final Cells

The initial cell of the mixer device comprises inner and outer side partitions and upper and lower partitions. Same further comprises:

- first and second feed through cavities connected to (or merged with) the first and second inlet ports E1, E2 of the housing for feeding in the first and second components to be mixed, and
- an output through cavity connected to (or merged with) the inlet opening 45 of an intermediate cell.

The final cell of the mixer device further comprises inner and outer lateral partitions as well as upper and lower partitions. Same also includes:

- an inlet hole connected to (or merged with) the outlet opening 46 of an intermediate cell, and
- an outlet hole connected to (or merged with) the outlet port of the housing 3.

The principle of operation of the mixer device will now be described in greater detail with reference to FIG. 6.

2. Principle of Operation

In a first step, the first and second constituents to be mixed are injected simultaneously into the device at the inlet ports E1, E2 of the housing 3. The injection of the two constituents is preferentially performed with flow-rates which remain in a constant ratio therebetween from the minimum flow rate to the maximum flow rate.

The first and second constituents enter the initial cell 4 and separate into the first and second main flows flowing around the inner partition of the initial cell 4.

As same flow towards the through outlet cavity of the initial cell 4, each of the first and second main flows is subdivided into circular secondary flows which join the main flow with which same are associated by following a convective movement (cf. FIG. 5). The mixing of the first and second constituents with one another is thereby enhanced.

Once the through outlet cavity has been reached, the first and second main flows join, which further enhances the mixing of the first and second constituents to be mixed.

The first and second constituents then enter successively into a plurality of stacked intermediate cells 2, 3. Upon crossing through each intermediate cell 2, 3, superposed layers of products are formed and the helical movement of the flows make the layers slip one with respect to another, which enhances the mixing thereof.

The final mixture is obtained at the outlet of the final cell 5 connected to the outlet port of the housing which acts as a concentrator. The final mixture can then be extracted from the device, e.g. by suction.

3. Example of Embodiment

FIG. 7 shows an example of embodiment of the mixer device described hereinabove.

In said embodiment, the walls of the housing coincide with the inner and outer partitions of the cells.

More specifically, the mixer device comprises first and second tubular casings:

- the first tubular casing 14 including a bottom 141,
- the second tubular casing 15—with an outer diameter smaller than the inner diameter of the first casing 14—includes circular rings 151 protruding radially outwards.

Each ring forms an upper or lower partition of a respective cell. Each ring comprises one (or a plurality of) through aperture(s) "Lu" defining:

- an outlet opening for an upstream cell (i.e. cell positioned over another cell), and
- an inlet opening for a downstream cell (i.e. cell positioned under another cell).

As illustrated in FIG. 7, the second casing 15 is intended to be inserted into the first casing 14 so that the first and second casings 14, 15 extend coaxially, the rings 151 defining, with the first and second casings 14, 15, the mixing cells 2, 3.

4. Conclusions

The above-described mixer device is used for industrially and flexibly producing low-alloy metal without mixing an entire bath, which avoids long and difficult cleaning operations between baths, and makes it possible to produce different metals in the same melt.

Of course, the mixer device can be used for applications other than mixing different metals for forming an alloy.

The reader would have understood that many modifications can be made to the mixer described hereinabove without departing materially from the new teachings and advantages described herein.

For example, in the preceding description, the cells and the housing were described as having a generally cylindrical shape. It is quite obvious for a person skilled in the art that the cells and/or the housing can have other shapes such as a parallelepipedal shape, an ovoid shape, etc.

Moreover, the reader would have understood from the example described at point 3 that the walls forming the cells and the housing can be partially merged, in particular relating to the inner and outer walls/partitions.

Thereby, the cells and the housing can be:

- separate physical elements assembled for forming the mixer device according to the invention, each physical element corresponding either to a cell or to the housing,
- parts of matching shapes intended for cooperating so as to define the walls of the housing and the partitions of the cells, each part defining a portion of cell(s) and/or a portion of housing (cf. example of embodiment illustrated at point 3), or
- in a single part composed of multiple panels defining the walls of the housing and the partitions of the cells.

The invention claimed is:

1. A mixer device comprising:

at least one inlet port for feeding in components to be mixed, and an outlet port for the recovery of a mixed product composed of said components, wherein the mixer device further comprises a housing including at least adjacent first and second mixing cells, the second cell extending over the first cell, each cell including an inlet opening and an outlet opening provided on opposite walls, the inlet opening being offset from the outlet opening such that the axis of the inlet opening is parallel to the axis of the outlet opening, the outlet opening of the first cell being connected to the inlet opening of the second cell;

wherein the mixer device further comprises:

a first tubular casing including a bottom, a second tubular casing having an outer diameter smaller than the inner diameter of the first casing, wherein the second casing comprises circular rings on the outer face thereof each having at least one through aperture, said rings extending radially and protruding towards the outside of the second casing, the diameter of the rings being substantially equal to the inner diameter of the first casing, and wherein the second casing is capable of being inserted into the first casing such that the first and second casings extend coaxially, the rings defining, with the first and second casings, the mixing cells.

2. The mixer device according to claim 1, wherein the housing is cylindrical and has coaxial tubular outer and inner walls defining a space for receiving the mixing cells.

3. The mixer device according to claim 2, wherein each mixing cell has a cylindrical shape and extends between the outer and inner walls of the housing.

4. The mixer device according to claim 3, wherein at least one of the mixing cells comprises diametrically opposed fluid inlet and outlet openings.

5. The mixer device according to claim 1, further comprising a plurality of superimposed mixing cells, the superimposed mixing cells being arranged so that the outlet of each upper cell extends in front of the inlet of the lower cell on which said each upper cell is placed.

6. The mixer device according to claim 5, wherein the plurality of mixing cells comprises:

an initial cell wherein the components to be mixed are fed, and a final cell through which the mixed product is discharged, the outer wall of the housing comprising a bottom for recovering the mixed product discharged from the final cell.

7. The mixer device according to claim 6, wherein the inner wall of the housing defines a discharge channel for the mixed product, the mixer device comprising a suction nozzle intended for being arranged in the discharge channel for the extraction of the mixed product.

8. The mixer device according to claim 1, wherein the housing extends longitudinally, the inlet and outlet ports extending at a same end of the housing.

9. The mixer device according to claim 1, wherein at least one of the cells comprises an element forming an obstacle.

10. The mixer device according to claim 9, wherein the element forming an obstacle is a ball on the flow path of the components.

11. A mixer device comprising:

at least one inlet port for feeding in components to be mixed, and an outlet port for the recovery of a mixed product composed of said components, wherein the mixer device further comprises a housing including at least adjacent first and second mixing cells, the second cell extending over the first cell, each cell including an inlet opening and an outlet opening provided on opposite walls, the inlet opening being offset from the outlet opening such that the axis of the inlet opening is parallel to the axis of the outlet opening, the outlet opening of the first cell being connected to the inlet opening of the second cell;

wherein the housing comprises an inner wall and an outer wall; and wherein the inner wall of the housing defines a discharge channel for the mixed product, the mixer device comprising a suction nozzle intended for being arranged in the discharge channel for the extraction of the mixed product.

12. A mixer device comprising:

at least one inlet port for feeding in components to be mixed, and an outlet port for the recovery of a mixed product composed of said components, wherein the mixer device further comprises a housing including at least adjacent first and second mixing cells, the second cell extending over the first cell, each cell including an inlet opening and an outlet opening provided on opposite walls, the inlet opening being offset from the outlet opening such that the axis of the inlet opening is parallel to the axis of the outlet opening, the outlet opening of the first cell being connected to the inlet opening of the second cell, and wherein the housing extends longitudinally, the inlet and outlet ports extending at a same end of the housing.

* * * * *